J. NICHOLS.

Assignor, by mesne assignments, to THOMPSON, PERLEY & WAITE.

High Chair for Children.

No. 8,454. Reissued Oct. 15, 1878.

Witnesses.

A. Scott

M. Gardner

Inventor

John Nichols by Crosby & Gregory

Attys

N. PETERS, PHOTO-LITHOGRAPHER, WASHINGTON, D. C.

UNITED STATES PATENT OFFICE.

JOHN NICHOLS, OF GARDNER, ASSIGNOR, BY MESNE ASSIGNMENTS, TO THOMPSON, PERLEY & WAITE, OF BALDWINSVILLE, MASS.

IMPROVEMENT IN HIGH CHAIRS FOR CHILDREN.

Specification forming part of Letters Patent No. 76,801, dated April 14, 1868; Reissue No. 8,454, dated October 15, 1878; application filed May 15, 1878.

*To all whom it may concern:*

Be it known that I, JOHN NICHOLS, of Gardner, in the county of Worcester and State of Massachusetts, have invented a new and useful Improvement in Children's High Chairs; and I do hereby declare that the following is a full, clear, and exact description thereof, which will enable others skilled in the art to make and use the same, reference being had to the accompanying drawings, forming part of this specification, in which—

Figure 1:
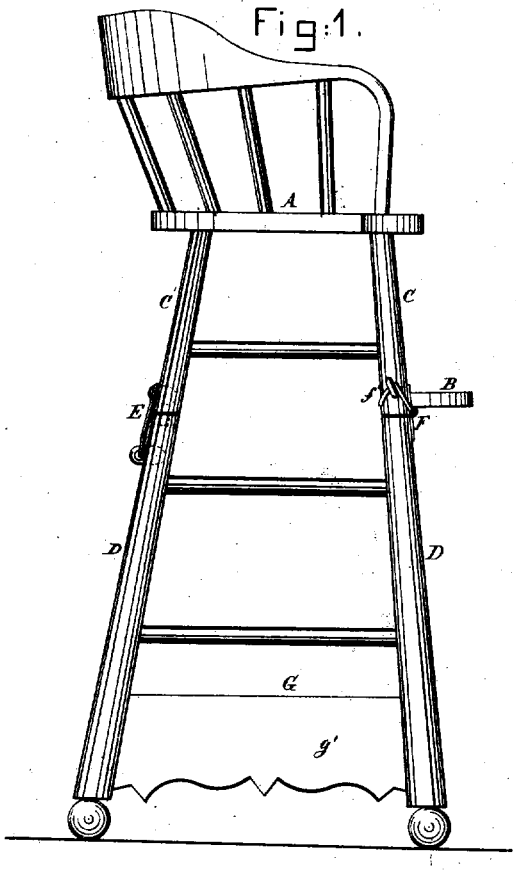
Figure 3:
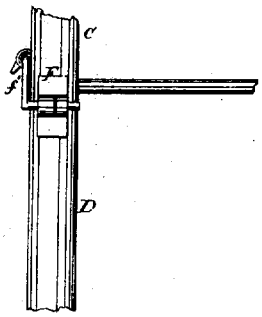
Figure 2:
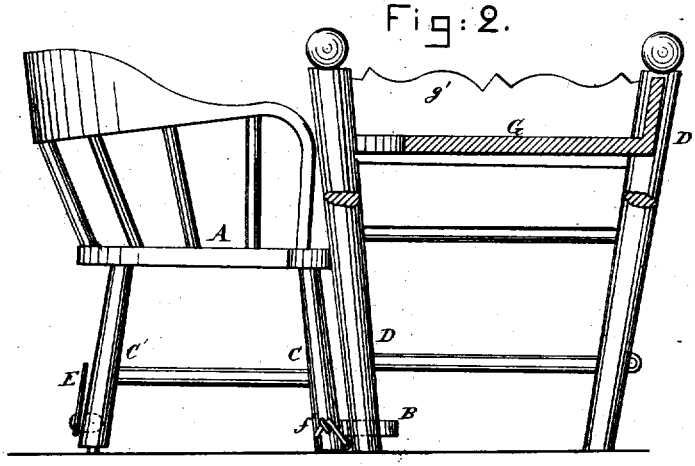

Figure 1 is a side view of my improved high chair. Fig. 2 is a side view of the same arranged to form a play-chair, or low chair and table, a part being broken away to show the construction. Fig. 3 is a detail view, showing the hinge.

My invention has for its object to so improve the construction of children's high chairs that they may be arranged as high chairs for use at the table, for low chairs or play-chairs, wherein a table connected with the chair is brought in front of the chair-seat to receive playthings, such chairs being easily and quickly adjusted for use in either form.

The invention consists in a high chair formed in two parts, hinged or connected together, so that the lower part of the high chair may be turned from under the seat, whereby such seat may be lowered or brought nearer to the floor, the same side of the seat serving to support the child both for the high and low chair.

A is the seat of the chair, and B the foot-board, connected rigidly with the downwardly-projecting portions C, which directly support the front edge of the seat in both its high and low positions, such foot-board being for the reception of the feet of the child occupying the seat when the seat is in either of its positions.

The frame of the chair, or that portion which supports the seat, is divided into two parts, C C′ D, so that the seat of the chair, by a change of position of the movable leg portions *d*, may be placed at such height as to form a high chair, as in Fig. 1, or to form a convenient low chair, as shown in Fig. 2.

The parts C and D are hinged to each other, so that the lower part, D, may be turned to a position in front of the seat. (See Fig. 2.) When adjusted as a high chair, (see Fig. 1,) the parts C′ D are secured to each other by a fastening device (shown as a hook, E,) pivoted to one of such parts, which hooks into an eye upon the other part.

To the lower or movable part, D, of the chair is attached a platform, G, which, when such part D is turned from the position occupied by it to support the seat A for a high chair to a position for a low chair, the seat being then simply lowered but not reversed, will place the said platform before the seat. The said platform may be at a convenient height with reference to the seat, and should have a flange, *g′*, around it, to prevent playthings from falling off; and the front edge of the platform, or that next the seat, may be slightly hollowed out, as shown in Fig. 2, to fit better the child's body. By this construction, the parts being hinged together, it will be impossible for the child to push the part D away or overturn either of said parts.

I claim—

1. In a combined high and low chair, the combination of a hinged reversible leg portion, an irreversible adjustable seat portion, and a tray or platform, substantially as described.

2. In a child's chair convertible from a high to a low chair by a change in position of the lower portions of the pivoted legs which elevate the seat for a high chair, a platform hollowed out at one edge and connected with the said pivoted legs, whereby, when said legs are placed in front of the lowered seat, a space is formed next the front of the said seat, substantially as and for the purpose described.

3. A child's chair composed of a seat part and a movable or pivoted leg part below the said seat, provided with a platform, whereby the same side of the same seat, by a change of position under it of the movable but connected leg part, may be used as the high seat or as the low seat, the platform, as the leg part is turned over toward the front of the seat, being brought to a position just in advance of the front of the seat, substantially as described.

4. In a convertible high and low chair, the reversible portions D of the legs of the chair, provided with the platform extended between said legs, and with a flange extending from that side of the platform which is undermost when the chair is used as a high chair, whereby when the portion D is inverted the flange projects upward and about the then upper sides of the platform, substantially as described.

5. In a child's chair, the seat portion, its permanently-connected foot-board, a tray or platform, and movable leg portion, pivoted below the seat portion to elevate it for a high chair, or lower but not reverse it for a low chair, combined with fastening devices to hold the seat and movable leg portions locked together for a high chair, the same foot-board being operative in both positions of the chair, substantially as described.

JOHN NICHOLS.

Witnesses:
WM. HOLDEN,
ADA A. NICHOLS.